(12) United States Patent
Roman (10) Patent No.: US 8,070,544 B2
(45) Date of Patent: Dec. 6, 2011

(54) CLEAN ENERGY POWERED SURFBOARDS

(76) Inventor: Kendyl A. Roman, Sunnyvale, CA (US)

( * ) Notice: Subject to any disclaimer, the term of this patent is extended or adjusted under 35 U.S.C. 154(b) by 224 days.

(21) Appl. No.: 12/459,500

(22) Filed: Jul. 1, 2009

(65) Prior Publication Data

US 2011/0003521 A1   Jan. 6, 2011

(51) Int. Cl.
*A63C 5/03* (2006.01)

(52) U.S. Cl. .................................. 441/74; 440/6; 440/44

(58) Field of Classification Search .................... 441/74; 440/44, 45, 6
See application file for complete search history.

(56) References Cited

U.S. PATENT DOCUMENTS

| | | | | |
|---|---|---|---|---|
| 4,424,551 A | * | 1/1984 | Stevenson et al. | 361/302 |
| 4,586,374 A | * | 5/1986 | SaynjaKangas | 73/187 |
| 4,756,698 A | * | 7/1988 | Gorg | 440/38 |
| 5,027,737 A | * | 7/1991 | Duffty et al. | 440/12.54 |
| 5,692,371 A | * | 12/1997 | Varshay et al. | 60/221 |
| 7,226,329 B2 | * | 6/2007 | Railey | 441/74 |
| 2006/0246790 A1 | * | 11/2006 | Goldmeer et al. | 440/45 |

* cited by examiner

*Primary Examiner* — Stephen Avila (57) ABSTRACT

Clean energy powered surfboard having various advantages that make for easy to learn, easy to use, safer, exciting, high performance, environmentally friendly surfing on any ocean wave in the world. The various embodiments include novel motor, turbine, or electric motor generator surfboards comprising hydrogen or electric-powered motors, which can be switch-activated and which drive jet pumps. Energy can be stored as compressed gas, including air and hydrogen. Energy can be stored in novel capacitors that are incorporated in the body of the surfboard. Energy can be generated by solar or water power while surfing or by passing waves, for example, while waiting for a big wave. An output jet provides thrust to catch a wave, to return to the wave breaks, or to avoid a hazard. A novel fin output jet increases stability and maximizes thrust. Self-contained, self-recharging embodiments are low cost, lightweight, safer, and good for the environment.

26 Claims, 8 Drawing Sheets

SIDE VIEW

Fig. 9

CLEAN ENERGY POWERED SURFBOARDS

BACKGROUND

1. Field of the Invention

The present invention relates to a surfboard, in particular surfboards that are powered by various types of stored energy, or generated and stored energy, especially clean energy.

2. Description of Prior Art

Background—Surfing and Surfboards

Surfing is a person riding down a breaking wave, conventionally gathering speed from the downward and forward movement. A breaking ocean wave is called the "surf." Surfing can also occur on a standing wave in a river or in a man-made artificial wave. The most common form of surfing utilizes a surfboard, which come in various lengths, shapes, and sizes.

Surfing originated in Polynesia and was first observed by Europeans in 1767. Traditional Hawaiian surfboards were made of wood such as koa or wiliwili, were heavy, and were as long as eighteen feet.

Prior to the 1930s, surfboards did not have fins. First keel fins were added, and then, in the 1940s the shape of the fin evolved to that used today. Also in the 1940s, hollow fiberglass or wooden surfboards had wooden cores. In the 1950s, foam cores became common. In the 1960s, smaller more agile "short boards" were developed. In the 1970s, more than one fin became common.

Background—Motorized Surfboard-Like Personal Watercraft

Over the last four decades, several attempts have been made to create powered surfboard using gasoline combustion engines. However, in practice these are very heavy water craft that are in essence a stand-up jet ski with the ability to go up to 40 miles per hour. These are commonly used on flat water rather than being true surfboards, used in ocean surf. Examples include the 1968 Jet Board, the now defunct Motorboard International's Surfjet (which weighed 135 pounds and required wheels to take it up the beach), and the similar Surfango PowerSurf FX (which weights 112 pounds).

Robert Montgomery, currently of PowerSki International Corporation, was issued U.S. Design Pat. No. D355,400 on Feb. 14, 1995. The Montgomery design shows a device similar to the Surfjet having a relative large engine compartment in the center of the watercraft and a flexible control handle.

U.S. Pat. No. 6,192,817 was issued Feb. 27, 2001, to Andrzej and Piotr Dec. The Dec patent discloses a watercraft similar to the Montgomery design having low profile internal combustion engine, a water pump, and complicated exhaust cooling and muffling assembly.

U.S. Pat. No. 6,702,634 was issued Mar. 9, 2004, to Koock Jung. The Jung patent discloses a motor and a cylindrical propeller both mounted under a surfboard. The Jung patent also discloses a retractable stop apparatus that functions as a water brake and automatic turning mechanism, and optional handle bars.

U.S. Pat. No. 6,901,872 was issued Jun. 7, 2005, to Darwin and Guama Battle. The Battle patent discloses a surfboard similar to the Surfjet but having two external propellers. The Battle patent discloses use of an internal combustion motor, or an electric motor with a battery pack.

U.S. Pat. No. 7,207,282 was issued Apr. 24, 2007, to Chia-Wen Ruan, et al. The Ruan patent discloses a prior art propeller unit that removably attaches to the back end of a surfboard, and a claimed propeller driven device that attaches under a surfboard. The Ruan patent further discloses that the motor control can be electrically wired or wireless.

Background—Electric Motors with Rechargeable Batteries on Surfboards

United States Patent Application Publication 2003/0167991 published Sep. 11, 2003, Stan Namanny. The Namanny publication discloses a kit for converting a conventional surfboard into a motorized one. The kit comprises a nickel cadmium battery powered electric motor attached to a fin. The kit is designed to replace a fin, or attach to a fin, on an otherwise unaltered surfboard. The kit also includes a conventional battery charger used to charge the batteries before going into the ocean, providing up to one hour of continuous operation per battery charge. Notably Namanny teaches that the kit is used to assist a surfer in paddling away from shore at a low rate of speed.

U.S. Pat. No. 7,226,329 was issued Jun. 5, 2007, to Mike Railey. The Railey patent discloses a surfboard having two internally mounted electric motors powered by lithium batteries to drive impellers. The Ruan patent further discloses board surface mounted hand throttle controls as well as wireless control.

Background—Waterwheels

Unrelated to the field of surfing, waterwheels have been used to harness power from moving water. A waterwheel is a machine for converting the energy of flowing or falling water into more useful forms of power, a process known as hydropower or water power. In the Middle Ages, waterwheels were used as tools to power mills and factories. A waterwheel comprises a wheel with buckets or blades arranged on the outside rim to form a driving surface.

Background—Water Powered Turbine Generators

Unrelated to the field of surfing, turbine generators are known to generate electricity using a turbine having a plurality of blades to drive a generator shaft. The generator shaft drives an electrical generator to produce electricity. The main difference between early waterwheels and a turbine is a swirl component of the water which passes energy to a spinning rotor allowing the turbine to be smaller, spin faster, and process greater flow.

Water turbine generators provide clean, renewable energy.

In some embodiments, a turbine generator may also function as an electric motor and a pump.

Background—Capacitors

Unrelated to the field of surfing, a capacitor is a passive electronic component consisting of a pair of conductors separated by a non-conductive region, known as a dielectric. When a voltage potential difference exists between the conductors, an electric field is present in the dielectric. The electric field stores energy between the conductors. The effect is greatest between wide, flat, parallel, narrowly separated conductors or plates. In practice, the dielectric between the plates passes a small amount of leakage current, thus unlike batteries, capacitors are substantially better for sort term storage and recharge than for long term storage.

Capacitors can be formed by rolling the conductors in a tight spiral forming a cylinder. The cylinder can then be placed in a canister.

More recently, supercapacitors have been made from carbon aerogel, carbon nanotubes, or highly porous electrode materials. These supercapacitors provide extremely high capacitance.

Background—Solar Cells and Solar Power

Unrelated to the field of surfing, a solar cell is a photovoltaic device that converts light, especially sunlight, directly into electricity. Assemblies of solar cells are arranged to form solar panels. Solar power from solar cells is an excellent for clean, renewable energy.

Background—Hydrogen

Unrelated to the field of surfing, is hydrogen-based power. Hydrogen power is an excellent form of clean, renewable energy.

When hydrogen combines with oxygen it produces heat energy and pure water. Pure hydrogen and oxygen can be obtained by splitting water. The energy needed to split the water can come from the sun or from stored electricity. Hydrogen is a gas and may be stored in pressurized tanks or chemically, such as metal hydrides to reduce the volume. Hydrogen can be then be burned cleanly to power an internal combustion engine with only water as its exhaust. Alternatively, hydrogen can react in a fuel cell to directly produce electricity, which can then cleanly power an electric motor.

Background—Problems Associated with Surfboards

Surfing became very popular in the 1960s. As many surfers age, they loose stamina and strength, and often they suffer joint problems that affect their ability to paddle out to waves and, more importantly, to have enough thrust to catch big wave.

Younger potential surfers are distracted from the sport because of the difficulty of learning the surf, most notably having enough thrust at the right time to catch the wave. These potential surfers are have many other sports to choose from including riding personal watercraft such as jet skis, wake boarding, body boarding, wind surfing, kitesurfing, sea kayaking, snow boarding, skating, skate boarding, and biking.

Many of the best surf spots drop the surfer into hazardous conditions such as shallow reefs and rocky shorelines. Examples are found at Poipu and Mavericks. Once a surfer ends up on the reef or rocks it is difficult to swim out of danger against an onslaught of crashing waves.

Many of the best surf spots are crowded so that it is becoming more difficult to avoid hitting other surfers who are on other types of boards (long boards versus short boards, or body boards).

Ocean surfers also encounter sharks and are sometime mistaken for wounded seals and are bitten by sharks. After being bitten, surfer may have difficulty swimming back to shore.

Attempts to create gasoline-powered surfboards have not been very successful or accepted by the surfing culture. They pollute the water and air and contribute to global warming. They also are complicated, expensive, heavy, and difficult transport. Further, they are regulated by government entities and may require EPA testing.

What is needed is a low cost, light weight, portable, powered surfboard that can be used to surf ocean waves, and, in particular, to provide a short burst of thrust to catch an wave or avoid a hazard. Further, what is needed is a powered surfboard that uses clean, renewable energy. Further, what is needed is an electric powered surfboard that can be recharged while in the water using solar, waterwheel, or water turbine generators.

SUMMARY OF THE INVENTION

It is an objective of the present invention to provide an improved powered surfboard having various advantages that make for easy to learn, easy to use, safe, exciting, high performance, environmentally friendly surfing on any ocean wave in the world. The various embodiments include novel motor, turbine, or electric motor generator surfboards comprising hydrogen or electric-powered motors, which can be switch-activated and which drive jet pumps. Energy can be stored as compressed gas, including air and hydrogen. Energy can be stored in novel capacitors that are incorporated in the body of the surfboard.

OBJECTS AND ADVANTAGES

Some objects and advantages of the present invention are:
a) To provide a powered surfboard for obtaining thrust to catch a wave.
b) To provide a powered surfboard that is lightweight.
c) To provide a powered surfboard that is portable.
d) To provide a powered surfboard that is easy to use.
e) To provide a powered surfboard that is low cost.
f) To provide a solar powered electric surfboard.
g) To provide a hydrogen-powered surfboard.
h) To provide a water-powered surfboard.
i) To provide a compressed gas powered surfboard.
j) To provide a powered surfboard that can allow a surfer to perform shark avoidance.
k) To provide a powered surfboard that can allow a surfer to rescue themselves when injured.
l) To provide a powered surfboard that can allow a surfer to rescue another surfer with minimal effort.
m) To provide a quicker and more effective method of returning to wave breaks.
n) To provide a quicker and more effective method of gaining momentum in order to catch a wave.
o) To provide a safer means of avoiding hazardous waves, obstacles, animals, or other surfers.
p) To reduce the learning curve by enabling a less skilled surfer to participate in surfing with minimized risk.
q) To provide a powered surfboard that offer higher performance.
r) To provide a powered surfboard that is adjustable to varying conditions.
s) To provide a powered surfboard that is minimal in cost and waste.
t) To provide means and methods of a powered surfboard that are environmentally friendly.

DRAWING FIGURES

In the drawings, closely related figures have the same number but different alphabetic suffixes.

| REFERENCE NUMERALS IN DRAWINGS | |
|---|---|
| 100 (a-b) | surfboard |
| 102 (a-c) | output tube |
| 104 | motor |

-continued

REFERENCE NUMERALS IN DRAWINGS

| | |
|---|---|
| 106 (a-f) | intake tube |
| 108 | switch |
| 110 (a-f) | intake port |
| 112 | output jet |
| 200 | energy storage |
| 202 | energy connection |
| 300 (a-b) | battery |
| 302 | capacitor |
| 304 | electric motor |
| 306 (a-c) | canister capacitor |
| 314 | electric motor generator |
| 320 | solar cell panel |
| 322 (a-c) | anode wire |
| 324 (a-c) | cathode wire |
| 400 | board surface |
| 402 (a-b) | foot |
| 404 (a-b) | channel input |
| 406 (a-b) | turbine generator |
| 408 (a-b) | channel output |
| 410 (a-d) | channel |
| 412 | wave face |
| 418 (a-c) | fin |
| 420 (a-b) | waterwheel |
| 422 (a-b) | edge-mounted waterwheel |
| 424 (a-c) | vane |
| 426 | axle |
| 520 (a-b) | wave |
| 522 (a-b) | surfer |
| 700 (a-e) | fin output jet |
| 900 | burst timer switch |
| 908 | wireless switch |
| 910 | low thrust switch |
| 920 (a-b) | rectifier |
| 930 | chassis ground |
| 940 | motor control |

SPECIAL DEFINITIONS generator—one that generates, as a machine by which mechanical energy is changed into electrical energy.

motor—any of various power units that develop energy or impart motion: as a small compact engine; internal combustion engine; especially: a gasoline engine or hydrogen engine; a rotating machine that transforms electrical energy into mechanical energy.

engine—a machine for converting any of various forms of energy into mechanical force and motion; also a mechanism or object that serves as an energy source.

pump—a device that raises, transfers, delivers, or compresses fluids or that attenuates gases especially by suction or pressure or both.

turbine—a rotary engine actuated by the reaction or impulse or both of a current of fluid (as water, steam, or air) subject to pressure and usually made with a series of curved vanes on a central rotating spindle.

impulse—a force so communicated as to produce motion suddenly.

propeller—one that propels; especially a device that consists of a central hub with radiating blades placed and twisted so that each forms part of a helical surface and that is used to propel a vehicle (as a ship or airplane).

capacitor—a passive electronic component consisting of a pair of conductors separated by a non-conductive region.

DESCRIPTION OF THE INVENTION

The present invention provides an improved powered surfboard having various advantages that make for easy to learn, easy to use, safe, exciting, high performance, environmentally friendly surfing on any ocean wave in the world. The various embodiments include novel motor, turbine, or electric motor generator surfboards comprising hydrogen or electric-powered motors, which can be switch-activated and which drive jet pumps. Energy can be stored as compressed gas, including air and hydrogen. Energy can be stored in novel capacitors that are incorporated in the body of the surfboard. Energy can be generated by solar or water power while surfing.

Powered Surfboard

Figure 1:
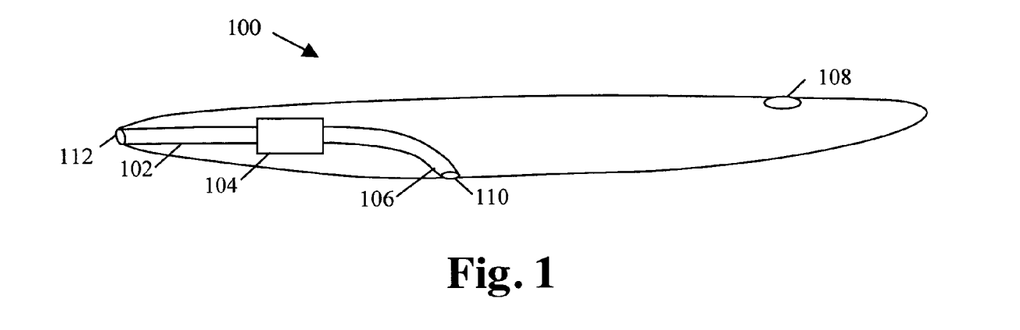
FIG. 1 illustrates a block diagram of a powered surfboard.

FIG. 1 illustrates a general block diagram of a clean energy powered surfboard 100 comprising a motor 104 attached to an intake tube 106 and an output tube 102. An intake port 110 is positioned on the side or bottom of the surfboard 100 and attaches to the intake tube 106. At least one output jet 112 is located at the rear of the surfboard 100 and attached to an output tube 102. A switch 108 is mounted on the surfboard 100 and is depressed, rotated, slid, or signaled to activate the motor 104 when needed.

A wireless switch 908 (see FIG. 9) may be signaled by using a hand held, wrist mounted, or swimsuit mounted wired or wireless transmitter.

A motor 104 is preferred to an external propeller because of drag and safety. The motor 104 further comprises a propeller or turbine, forming a pump, and may be powered by hydrogen, electricity, or compressed air. Water enters the intake port 110 and is channeled through an intake tube 106 to the motor 104. The motor 104 drives the water via the output tube 102 to the output jet 112, allowing the water exhaust from the output jet 112 to propel the surfboard forward with a short burst of high thrust.

When trying to catch a wave, in this first mode, the short burst of high thrust will allow the surfer to catch waves more effectively. With the powered surfboard 100 an expert can catch harder waves and a novice can enjoy surfing much more quickly and safely. The short burst of high thrust can also be used to avoid a hazard.

When returning the surfboard to the wave breaks (starting point), returning to the shore when tired or injured, or to move away from a hazard, in a second mode, the motor is optionally configured to provide a steady, low thrust over an extended period of time. Unlike Jet Skis and Surfjet-like device, this second mode would not provide high speeds that may be dangerous for swimmers and other boarders (requiring regulation by government entities) but would only provide a low speed, which is less than the speed at which an average unassisted surfer could paddle. Thus, embodiments with both these modes would result in a clean energy powered surfboard that has no higher performance speed, or other behavior, than that of a board powered by a young healthy surfer without a handicap. Thus, such clean energy powered surfboards would arguably be exempt from many government regulations associated with personal watercraft and boats, in that they are equivalent to a non-powered surfboard in all of its intended operations and behaviors.

Energy Storage

Figure 2:
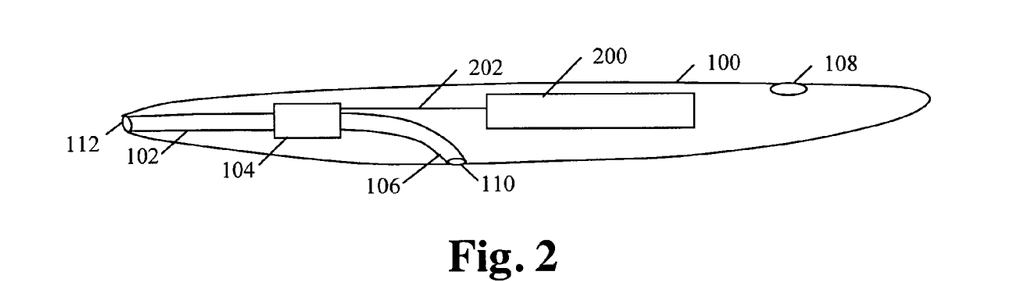
FIG. 2 illustrates a block diagram of a powered surfboard with energy storage.

FIG. 2 illustrates a block diagram of the energy storage 200 capacities within the surfboard 100. The stored energy is communicated from energy storage 200 via energy connection 202.

In one embodiment, energy storage 200 contains compressed gas that is released to turn the motor 104 and released with the water as exhaust via the jet 112.

In another embodiment, energy storage 200 contains compressed gas that is released directly as exhaust via the jet 112, eliminating the motor.

In another embodiment, energy storage 200 contains compressed hydrogen gas which is combusted to turn the motor 104 which draws in water from intake port 110 into intake tube 106 and propels it through output tube 102 to output jet 112

In yet other embodiments, energy storage 200 stores electrical energy, such as those shown in FIG. 3A through FIG. 3D.

Electrical Storage

FIG. 3A through FIG. 3D illustrate block diagrams of various embodiments of electrical storage. Each instance illustrates a surfboard 100 comprising a motor 104 which creates thrust via the output jet 112. The motor 104 is attached to an intake tube 106 and an output tube 102. An intake port 110 is positioned on the side or bottom of the surfboard 100 and attaches to the intake tube 106. The output jet 112 is located at the rear of the surfboard 100 and attached to an output tube 102. A switch 108 is mounted on the surfboard 100 and is depressed, rotated, slid, or signaled to activate the motor 104 when needed.

Battery

Figure 3A:
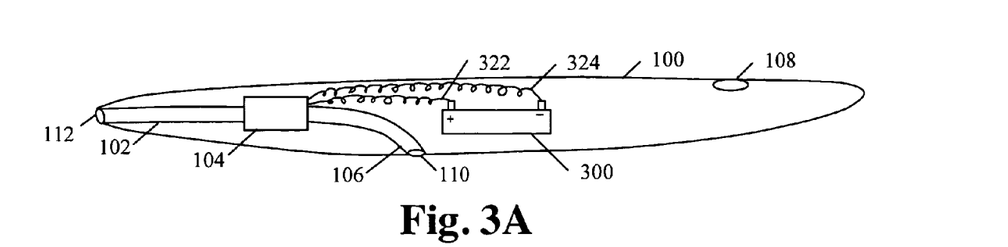
FIG. 3A through FIG. 3D illustrate block diagrams of various embodiments of electrical storage.

FIG. 3A illustrates an electric powered embodiment where the energy storage is in the form of at least one battery 300. The battery 300 is connected to the motor 104 with an anode wire 322 and a cathode wire 324.

The battery 300 may be charged by solar (see FIG. 3B) or water power (see FIGS. 4A through 4E and FIGS. 5A and 5B), or a conventional recharging system (not shown).

When activated by the switch 108, the battery 300 provides energy to the electric motor 104 which creates thrust via the output jet 112.

Solar

Figure 3B:
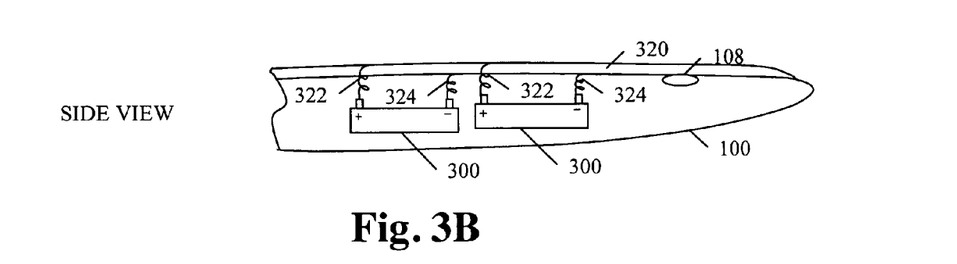

FIG. 3B illustrates aspects of a solar powered embodiment where exemplary rechargeable batteries 300 are attached to a solar cell panel 320. The solar cell panel 320, comprising multiple solar cells, is mounted preferably on the top of the surfboard 100 and may cover the entire width of the surfboard for a predetermined length of the surfboard 100. The batteries 300 are positioned in the internal structure of the surfboard 100 and connect to the solar cell panel 320 by anode wires 322 and cathode wires 324.

When activated by the switch 108, the batteries 300 provides electrical energy to the motor 104 which creates thrust via the output jet 112.

Alternatively, the solar cell panel 320 could be connected to capacitors (such as 302 or 306), instead of batteries 300. The use of capacitors are explained below in reference to FIG. 3C and FIG. 3D.

And yet in another embodiment (not shown), the solar cell panel 320 is comprised of a flexible solar film placed on the board surface 400.

Capacitor Plates

Figure 3C:
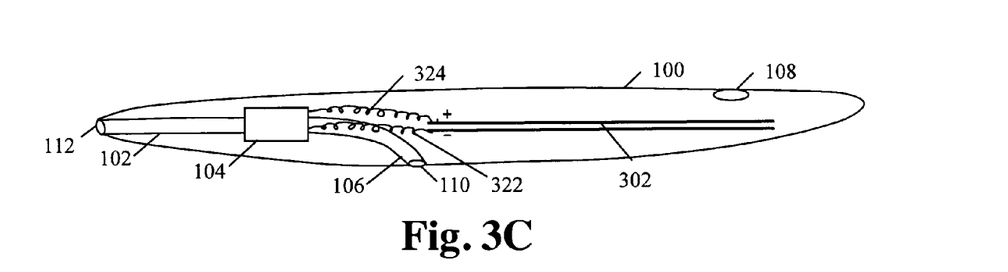

FIG. 3C illustrates an embodiment where electrical energy is stored in a capacitor 302 comprised of a positive plate and a negative plate separated by a small distance. In one novel embodiment the positive plate and the negative plate are almost as wide and almost as long as the main body of the surfboard 100. The capacitor 302 is embedded within the surfboard 100 during its construction and connects to the motor 104 by anode wires 322 and cathode wires 324. The capacitor 302 operates similarly to the battery 300 in its ability to store a charge and to release the energy to the electric motor.

In another novel embodiment (not shown), a plurality of plate capacitors 302 could be stacked inside the core of the surfboard 100.

In yet another novel embodiment (not shown), at least one plate of a first capacitor 302 could form the structure of the upper surface of the surfboard 100, and at least one plate of a second capacitor 302 could form the structure of the upper surface of the surfboard 100. The outer plates could be grounded to each other and preferably also grounded to the water. Theses structural plates could be made of thicker than normal metal or carbon fibers. The corresponding nonstructural plates would be separated from the stronger structural plates by a dielectric layer, such as plastic. The other surfaces of the surfboard 100 could be formed of conventional materials, such as fiberglass and the core could then be filled with foam.

When activated by the switch 108, the capacitor 302 provides electrical energy to the motor 104, which creates thrust via the output jet 112.

Canister Capacitors

Figure 3D:
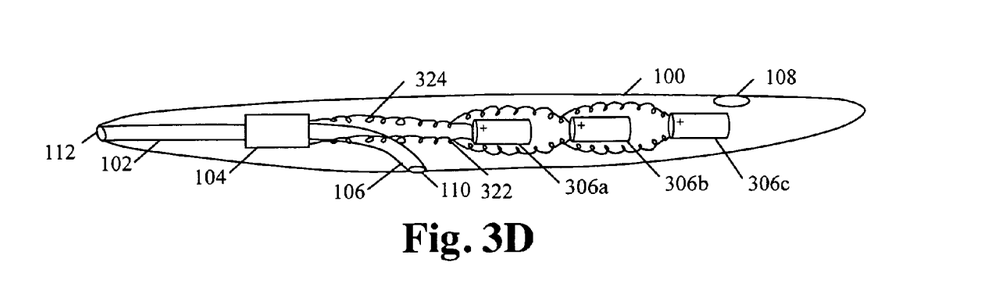

FIG. 3D illustrates an embodiment where electrical energy is stored in one or more canister capacitors 306. Three canister capacitors 306(a-c) are shown here for illustrative purposes. Each canister capacitor 306 is comprised of a positive plate and a negative plate separated by a small distance, rolled up and stored in a discrete canister. In practice, dozens of canister capacitors 306 could be embedded in the core of the surfboard 100 and wired together. The canister capacitors 306 connect to the motor 104 by anode wires 322 and cathode wires 324. The canister capacitors 306 operate similarly to the battery 300 in their ability to store a charge and to release the electrical energy to the motor.

When activated by the switch 108, the canisters capacitor 306 provides electrical energy to the motor 104, which creates thrust via the output jet 112.

Water Channels for Turbine Generators

Figure 4A:
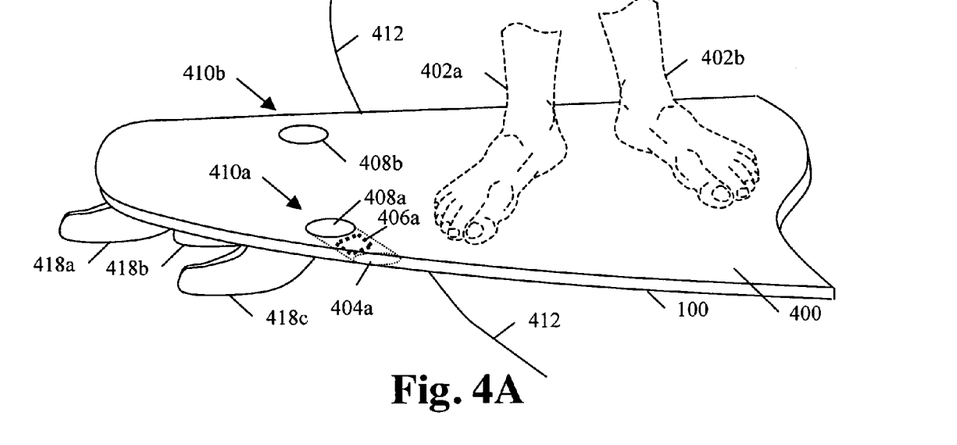
FIG. 4A through FIG. 4E illustrate water-powered embodiments which use turbine generators and waterwheels.

FIG. 4A illustrates aspects of an exemplary water-powered embodiment comprising novel channels 410(a-b) in the rear of the surfboard 100 near fins 418(a-c). Each channel 410 is comprised of a channel input 404, (e.g. 404a) positioned on the bottom of the surfboard 100, a channel output 408, (e.g. 408a or 408b) positioned on the top of the surfboard 100, and a turbine generator 406 (e.g. 406a) within the channel 410.

As the surfboard 100 moves through the water while being driven by a wave 412, gravity and water apply strong forces to the surfboard 100. The water-powered embodiment takes advantage of the strong water forces to drive turbine generators 406 to charge the electrical forms of energy storage 200 (see FIG. 2), such as a battery 300 (e.g. see FIG. 3A, FIG. 3B, and FIG. 8), capacitor 302 (e.g. see FIG. 3C), canister capacitor 306 (e.g. See FIG. 3D), or to create hydrogen from the water. As a surfer 522 (not shown) rides the surfboard 100 by placing the surfer's feet 402 on the board surface 400, the water flows through channels 410 to drive the turbine generators 406. The charging period while riding a wave is sufficient to store the energy needed to return to the next start, and some of the charge could be drawn off to return the surfboard to the wave breaks (starting point) or to provide thrust to catch the next wave, or wave set.

Waterwheels

Figure 4B:
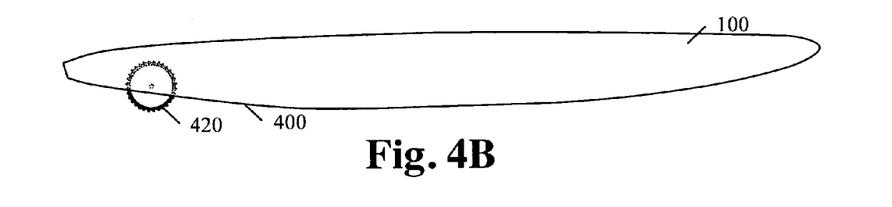
Figure 4C:
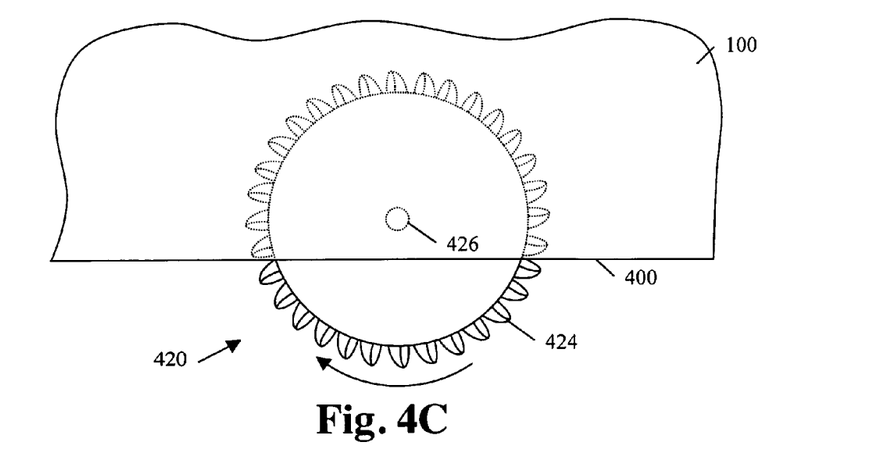
Figure 4D:
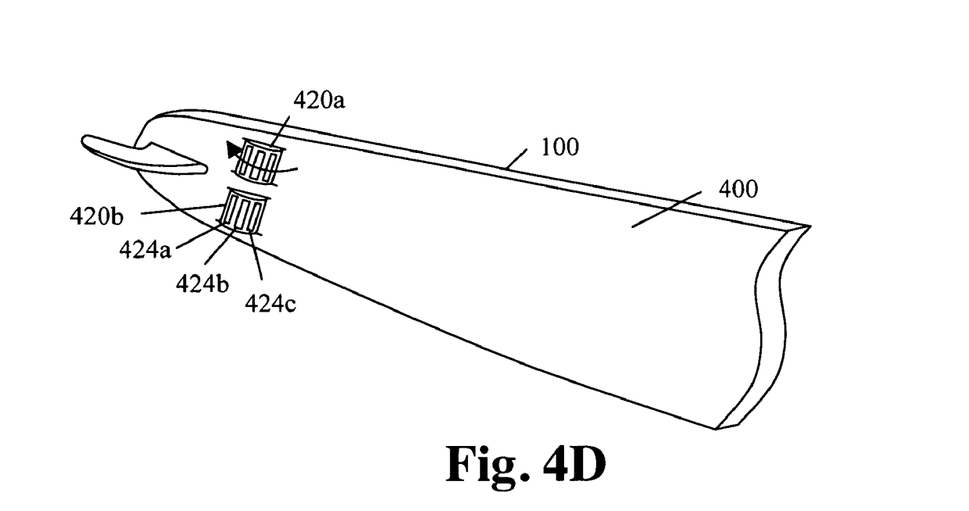

FIG. 4B through FIG. 4D illustrate aspects of embodiments of water powered surfboards 100 having at least one waterwheel 420 exposed on the bottom board surface 400 of the surfboard 100.

FIG. 4B and FIG. 4C illustrate details of aspects of one embodiment of the waterwheel 420 comprising multiple vanes 424. The waterwheel 420 is mounted inside the surfboard 100, but partially extends beyond the plane of the bottom board surface 400. The waterwheel 420 is mounted on an axle 426 that drives a generator (not shown). As the surfboard 100 moves through the water, the vanes 424 catch the water and drive the waterwheel 420 to generate electricity.

Figure 4E:
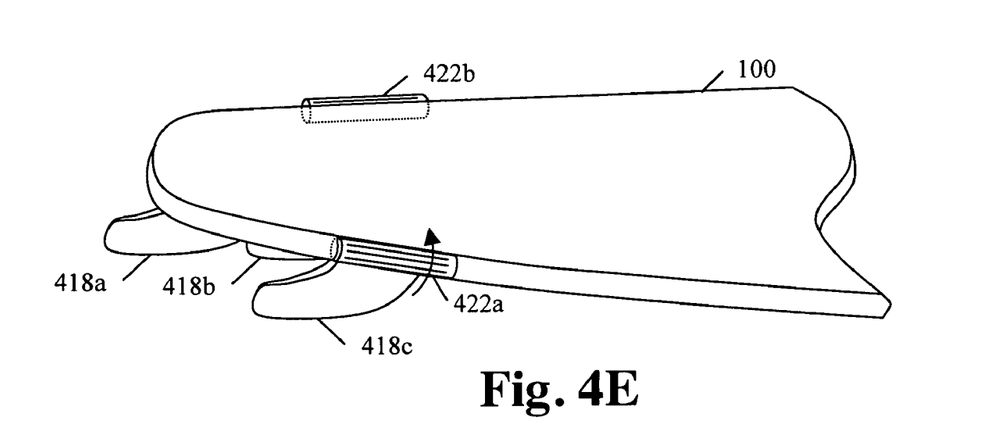

The waterwheel 420 could be relative flat like a disc as shown here, or alternatively could be cylinder shaped as shown in FIG. 4D and FIG. 4E.

FIG. 4D illustrates aspects of an embodiment having one or more waterwheels 420 (exemplarily shown here with two waterwheels 420a and 420b) exposed on the bottom board surface 400 of the surfboard 100. In this embodiment the waterwheels 420 are cylindrical and have long vanes 424(a-c) which are perpendicular to the flow of the water under the surfboard 100. Multiple waterwheels 420 could be attached to a single axle and generator. Alternatively, each waterwheel 420 could have a small generator inside the body of the waterwheel 420.

FIG. 4E illustrates aspects of a water powered surfboard 100 having one or more edge-mounted waterwheels 422 (exemplarily shown here with two edge-mounted waterwheels 422(a-b)) positioned along the trailing edges of the surfboard 100. Similar to the operation of the surfboard 100 shown in FIG. 4A, as the surfboard 100 continuously falls through the wave, great forces are applied by the water passing around the sides of the surfboard 100. These water forces drive the edge-mounted waterwheels 422.

Bi-Directional Channels

Figure 5A:
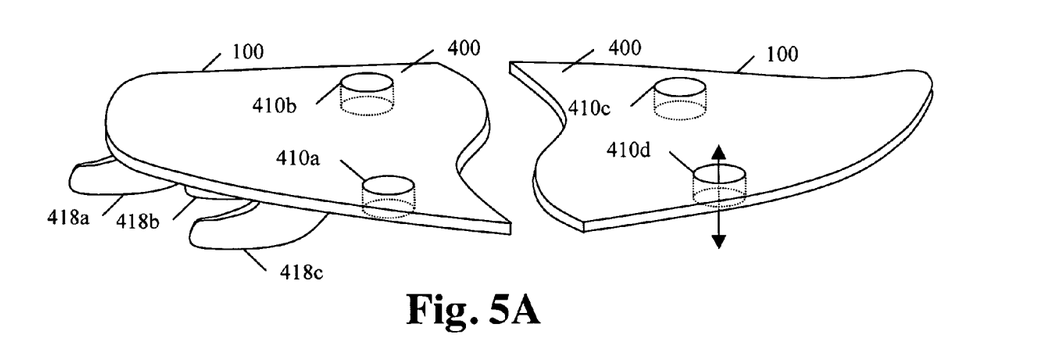
FIG. 5A and FIG. 5B illustrate water-powered embodiments with bi-directional channels.
Figure 5B:
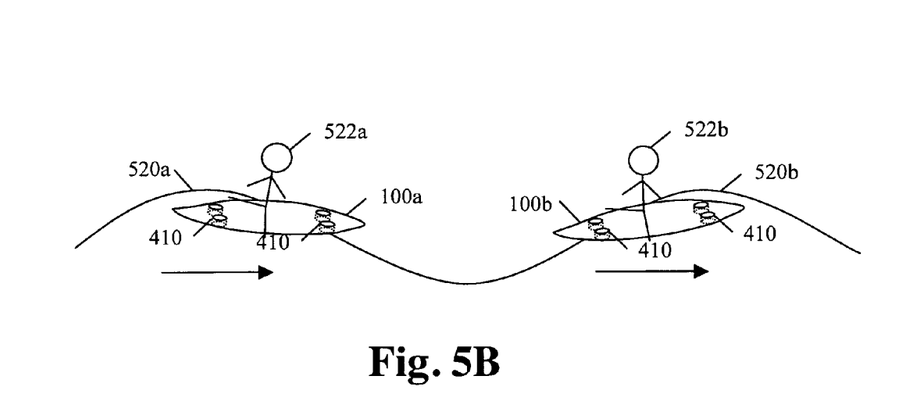

FIG. 5A and FIG. 5B illustrate water-powered embodiments with bi-directional channels.

FIG. 5A illustrates aspects of a surfboard 100 comprising multiple wave channels 410 and fins 418(a-c). The channels 410(a-d) are positioned at the front and rear of the board and are bi-directional such that the turbines 406 inside the channels 410 (see FIG. 4A) in the front and rear charge as water flows up and down through channels 410 relative to surfboard 100. This enables the energy storage 200 (see FIG. 2) to be recharged even when a surfer 522 is merely sitting on the surfboard 100 waiting to catch a wave, or waiting for the next set of waves. Forms of energy storage 200 (see FIG. 2) could be a battery 300 (e.g. see FIG. 3A, FIG. 3B, and FIG. 8), capacitor 302 (e.g. see FIG. 3C), canister capacitor 306 (e.g. See FIG. 3D), or hydrogen split from water. Further, the rear channels 410 would work similar to those shown in FIG. 4A when riding a wave.

FIG. 5B illustrates a method of recharging the battery using passing waves. Two surfers 522(a-b) on two surfboards 100(a-b), respectively, each surfboard 100 having multiple wave channels 410. As the wave moves past each surfboard 100, water flows up and down through the channels 410. Even if the waves die down, and the water is perfectly calm, surfers 522 could still shift their weight on the board to charge the electrical storage using this configuration.

Multiple Input Ports

Figure 6A:
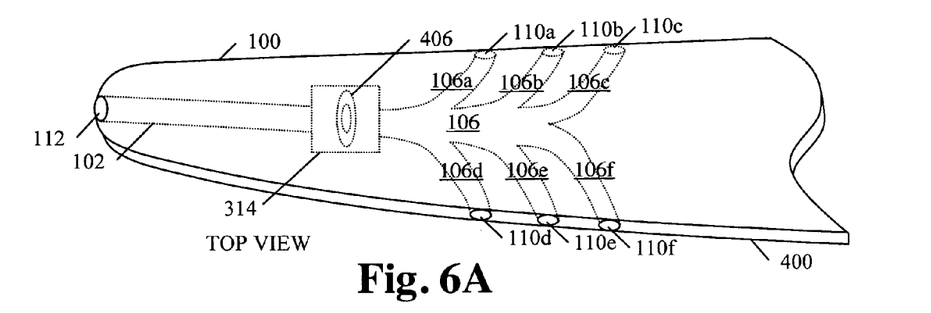
FIG. 6A and FIG. 6B illustrate embodiments with multiple input ports.
Figure 6B:
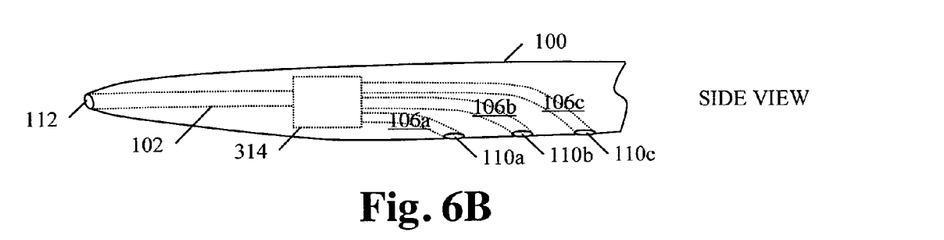

FIG. 6A and FIG. 6B illustrate aspects of embodiments of surfboard 100 having a water-powered electric motor generator 314 and multiple intake ports 110, which are positioned along the side of the surfboard 100. In FIG. 6A multiple intake tubes 106(a-f) attach to the intake ports 110(a-f) respectively on the board surface 400 of the surfboard 100 and combine into a single intake tube 106, which attaches to the electric motor generator 314 internal to the surfboard 100. Similar to FIG. 1, the electric motor generator 314 drives the output jet 112 by means of an output tube 102.

The same turbine 406 of the electric motor generator 314 is be used to drive the output jet 112 as well as to recharge the energy storage 200 (see FIG. 2). Forms of energy storage 200 (see FIG. 2) could be a battery 300 (e.g. see FIG. 3A, FIG. 3B, and FIG. 8), capacitor 302 (e.g. see FIG. 3C), canister capacitor 306 (e.g. See FIG. 3D), or hydrogen split from water. An electric motor generator 314 such as in the FIG. 6A, FIG. 6B and FIG. 8 embodiments has dual functions, both as an embodiment of a turbine channel 410 (as in FIG. 4A) while riding a wave, and as a jet drive motor 104 (as in FIG. 3A, FIG. 3C, and FIG. 3D) while under electrical power. While riding a wave, water is forced up through one or more of the intake ports 110(a-f) and forces the turbine 406 (internal to the electric motor generator 314) to turn the generator to generate electricity, which is then stored. When the switch 108 (not shown) is activated, the stored electrical energy is delivered to the electric motor generator 314, which drives to turbine 406 to pump water in the intake ports 110 and force it out through output jet 112, providing thrust.

In FIG. 6B, multiple intake tubes 106(a-c) attach to the intake ports 110(a-c) respectively on the bottom of the board surface 400 of the surfboard 100 and connect separately to the electric motor generator 314 internal to the surfboard 100. This has the advantage of still powering the turbine 406 (internal to the electric motor generator 314) to turn the generator to generate electricity even when another intake port 110, such as 110c, is not having water forced into to it.

While six intake ports 110 are shown in FIG. 6A and three intake ports 110 are shown in FIG. 6B, the number of location of the input ports 110 could vary.

Fin Output Jets

Figure 7:
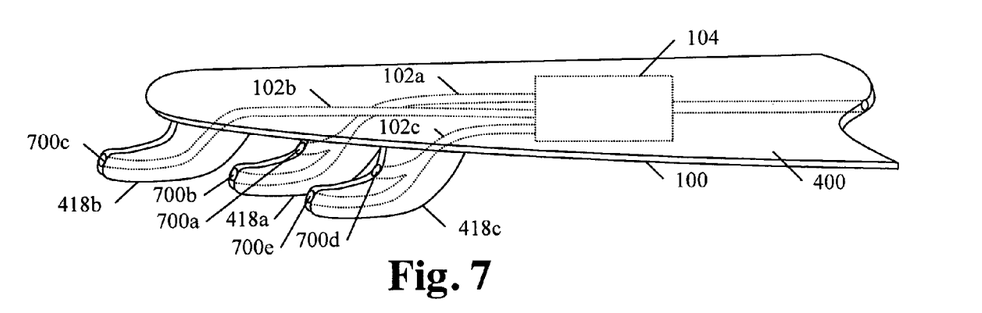
FIG. 7 illustrates an embodiment having fin output jets.

FIG. 7 illustrates an aspect of a powered surfboard 100 having the output jet 112 incorporated into the fins 418 with at least one fin output jet 700. The fins 418 are attached to the bottom board surface 400 of the surfboard 100. Output tubes 102 connect the fin output jets 700 to the motor 104, and allow the motor 104 to drive the fin output jets 700. Both a single and dual output jet embodiments are illustrated. In one embodiment, a single output jet is incorporated into fin 418b with only one fin output jet 700c, which is positioned at the bottom of the fin 418b. In another embodiment, dual output jets are incorporated into fins 418(a, c) containing fin output jets 700(a-b) and 700(d-e) respectively. The fin output jets 700a and 700d are positioned at the top of the fins 418a and 418c, respectively, while the fin output jets 700b and 700e are positioned at the bottom. The output tubes 102(a-c) are connected to fins 418(a-c) respectively. The novel fin output jet 700 offers added stability to the surfboard 100 and enables the output jet 700 to remain submerged in the water, where the exhaust will be more effective to thrust the surfboard 100 forward.

Combined Elements

Figure 8A:
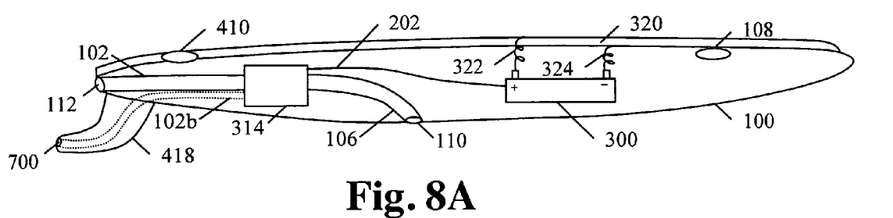
FIG. 8A and FIG. 8B illustrate a block diagram of an embodiment having multiple features.
Figure 8B:
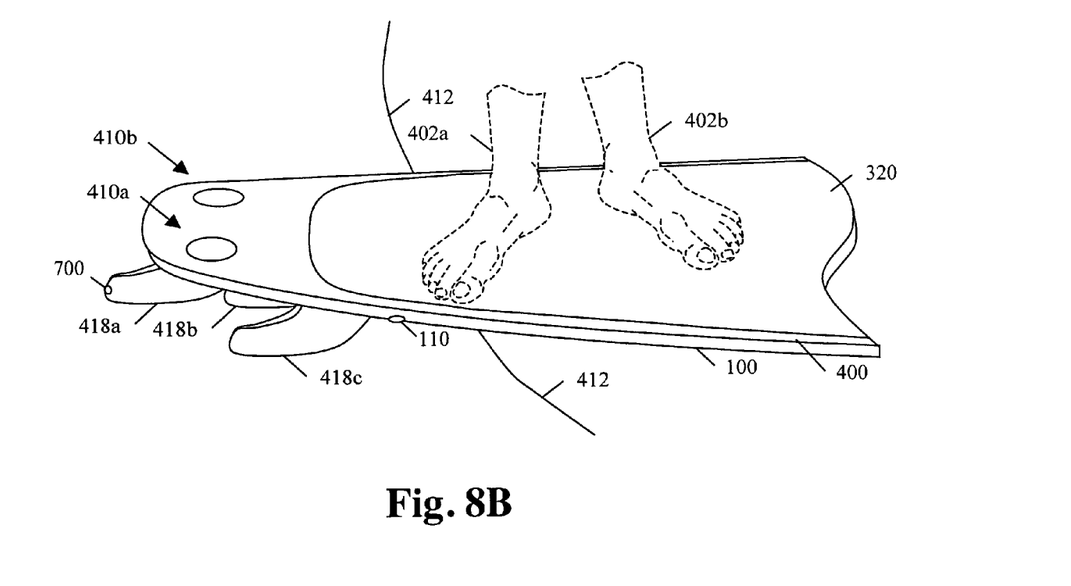

The foregoing has disclosed various elements that may be combined to form any number of embodiments of the present invention. FIG. 8A and FIG. 8B illustrate an exemplary powered surfboard combination that provides a surfer with multiple energy storage, charging and propulsion systems to better adjust to varying surfing conditions.

The embodiment shown in FIG. A of a combined water and solar powered surfboard 100 comprises a solar cell panel 320, comprising multiple solar cells, mounted on the top surface 400 of the surfboard 100 and extending the entire length of the surfboard 100. A battery 300 is positioned in the internal structure of the surfboard 100 and connects to the solar cell panel 320 by anode wires 322 and cathode wires 324. The stored energy of the battery 300 is communicated from energy storage 200 via energy connection 202. The switch 108 activates the energy transfer.

The surfboard 100 also comprises an electric motor generator 314 attached to an intake tube 106 and an output tube 102. An intake port 110 is positioned on the side or bottom of the surfboard 100 and attaches to the intake tube 106. At least one output jet 112 is located at the rear of the surfboard 100 and attached to an output tube 102.

A fin 418 is attached to the bottom board surface 400 of the surfboard 100. In one embodiment, a second output tube 102b connects the fin output jets 700 to the electric motor generator 314, and allow the electric motor generator 314 to drive the fin output jets 700.

The surfboard 100 also comprises one or more channels 410 in the rear of the surfboard 100, such as those shown in FIG. 4A.

The embodiment of FIG. 8B shows the solar cell panel 320 extending only part of the length of the surfboard 100.

Other combinations of elements are anticipated. For example, in a currently preferred embodiment, the battery 300 of FIG. 8 is replaced by capacitors (302 or 306) to avoid possible ocean contamination from rechargeable battery 300 leakage and the plurality of channels 410 are located in both the front and the back such as shown in FIG. 5A and FIG. 5B.

In yet another embodiment, the electricity from solar or water power could be used to separate hydrogen and oxygen from salt water. The hydrogen could be stored in a bladder or tank inside the board (a form of energy storage 200) and then used to drive a clean burning combustion engine (having no carbon emissions).

Exemplary Circuit Diagram

Figure 9:
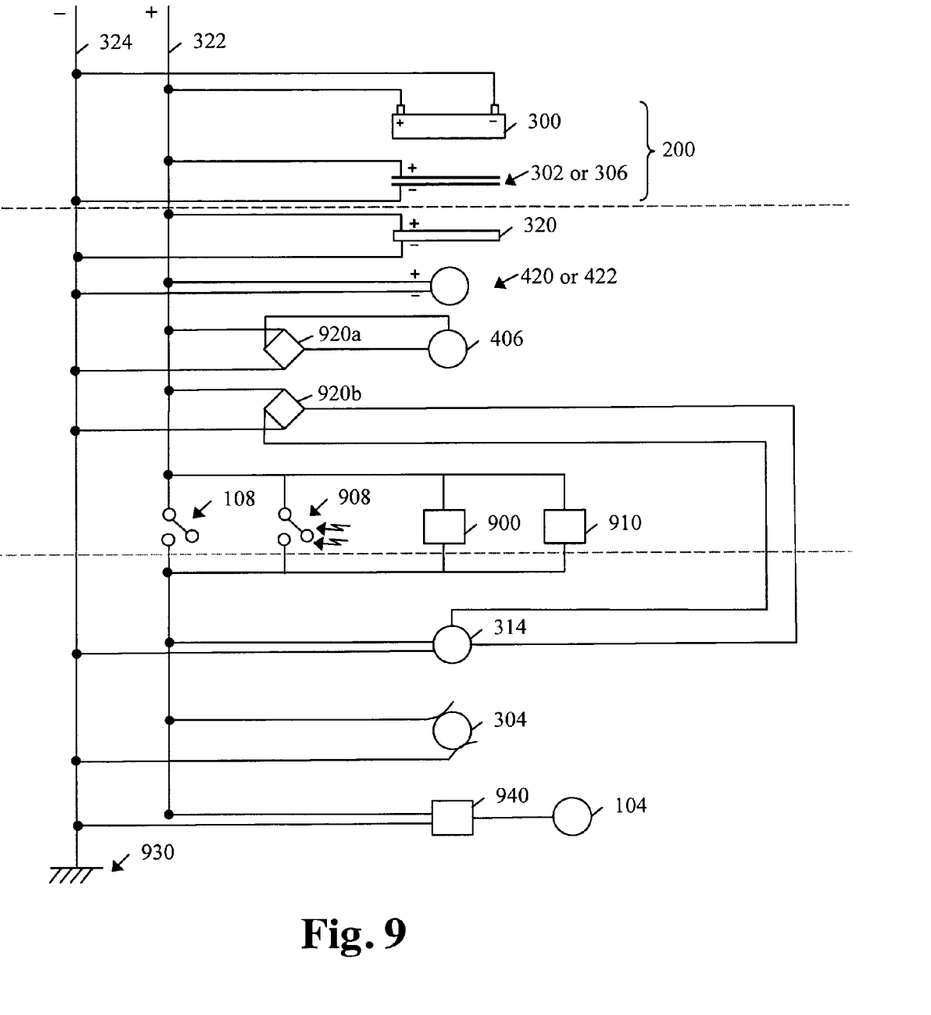
FIG. 9 illustrates a circuit diagram.

FIG. 9 illustrates an exemplary circuit diagram showing how various optional elements of various embodiments would be connected if they were used.

The anode wires 322 and cathodes wire 324 form an energy connection 202 between energy storage 200 and the various motor options (e.g. motor 104, electric motor 304, or electric motor generator 314). In some embodiments, such as a surfboard with a board surface 400 comprised in part by metal, the cathodes wires are connected chassis ground 930.

Energy storage 200 can be configured using one or more of batteries 300, capacitors 302 or canister capacitors 306.

Self-recharging sources can be configured using one or more of solar cell panels 320, turbine generators 406, waterwheels 420, edge-mounted waterwheels 422, or electric motor generators 314. Turbine generators 406 which could produce alternating current should be isolated from the energy storage via a rectifier 920a. An electric motor generator 314, when a switch is operated, is driven by the energy storage, but generates and stores energy when being driven by a wave, thus a rectifier 920b is used to isolate the electric motor generator 314 when it is not charging. In one embodiment, the switch would disconnect the charging circuit when the switch is active.

Switch options include one or more of a simple switch 108, a wireless switch 908, a burst timer switch 900, or a low thrust switch 910. When any switch is operated, energy it transferred to the cathodes wire 324 below the switches to operate the motors (104, 304, or 314) to create thrust. In the case of a non-electric motor 104 (such as a hydrogen burning or compressed air motor), any switch would activate a motor control 940, such as a throttle or valve, which would then control the non-electric motor 104.

The burst timer switch 900, when depressed would activate a burst of high thrust for a predetermined period of time. In one embodiment, the period of time could be adjusted by a switch or dial which is part of the burst timer switch 900.

The wireless switch 908 is operated when a wireless receiver detects a wireless signal (as discussed above).

The low thrust switch 910 would provide low thrust for an extended period of time while the low thrust switch 910 is being operated. The low thrust could be implemented as a series of intermittent pulses or by constraining the amount of energy delivered to the motor.

Minimal Storage and Horsepower

It will be understood from the foregoing that powered surfboards of the present invention can be made with smaller, lighter, less expensive components, than have been required by previous attempts at powered surfboards. For example, a water powered embodiment that uses a channel 410 (e.g. FIG. 4A), a waterwheel 420 or 422 (e.g. FIG. 4B through FIG. 4E), or an electric motor generator 314 (e.g. FIG. 6B) and capacitors (302 or 306) is self-contained and self-recharging. Thus, only enough energy for the next action, for example, to catch the next wave, is required to be stored at any time. The capacitors can be relatively small and lightweight compared to batteries or gasoline tanks. The motor does not have to produce high horse power or speed, but only a quick burst of thrust.

Excess Power Generation

In some embodiments, the solar powered and/or water powered surfboard can generate and store more energy than is needed for surfing. A waterproof socket can be provided for releasing the excess energy for other purposes while on shore such as provide LED light for camping, recharging a cell phone, iPod, or laptop computer, or recharging a car battery.

An embodiment could be designed to generate and store a significant amount of electrical energy that could be resold, such that surfers would actually be earning money and saving the environment by surfing.

ADVANTAGES

Environmentally Friendly

These powered surfboards use "green" power such as solar, wave power, and hydrogen. These clean, renewal types of power are environmentally friendly and consistent with traditional surfer values.

Safe

The powered surfboard can minimize the risk of accident or injury by enabling surfers to move away quicker in order to avoid collision with another surfer who is riding a wave, or to escape from a wave that is too powerful. It may also enable surfers to avoid shark attacks by escaping from a threatening predator. If a shark bites a board that contains a capacitor (such as 302 or 306) the shark would be repelled by the electrical shock. The powered board may also enable surfers to navigate to safety in case of injury or incapacitation.

Unlike jet skis and Surfjet-like devices, these powered surfboards are not designed to independently move at high speeds, endangering swimmers and traditional surfers, and requiring safety cutoffs. Instead they are designed to operate in the same mode and speeds as convention surfboards, albeit providing equalizing assistance for the novice, mature, or handicapped surfer.

Rescue

The powered surfboard enables surfers to navigate to safety in case of injury or allow other surfers to aid in the rescue in case of incapacitation.

High Performance

Powered surfboards can return a surfer to wave breaks faster or gain momentum in order to catch a wave.

Easy to Learn

Because the powered surfboard reduces the need for extensive swimming and makes it easier to catch a wave, surfing is accessible to less-experienced surfers.

Easy to Use

The switch is easy to activate.

Thrust is automatically provided when needed to catch a wave.

Embodiments that are self-contained, such as those recharged by solar or water power, do not require refueling or manual recharging.

Solar cells positioned on the deck of the surfboard can provide increased traction for surfers to easily maintain balance and grip, thus reducing the need to wax the deck.

Lightweight and Portable

These powered surfboards are lighter weight than gasoline powered Surfjet-like devices. They can be carried as a normal surfboard, rather than with a customized wheeled cart.

Embodiments that are self contained, such as those recharged by solar or water power, only require enough stored energy for a single action, such as catching the next wave, and thus can be made with smaller, lighter components.

Lower Cost to Make and Operate

These powered surfboards are lower in cost to make and to operate.

CONCLUSION, RAMIFICATION, AND SCOPE

Accordingly, the reader will see that the improved, high performance, environmentally friendly powered surfboards are easy to learn, easy to use, safer and exciting.

While the above descriptions contain several specifics these should not be construed as limitations on the scope of the invention, but rather as examples of some of the preferred embodiments thereof. Many other variations are possible. For example, different types of electrical storage can be substituted or used together, and component scan be located in different locations. Further, the number of components can be reduced or increased. The switch could be connected to a timer such that a thrust burst of a predetermined time, such as 5 seconds, would be started every time the switch is activated. Further some of these novel concepts are not limited to surfboards but could be used for body boards, or other vessels. For example, larger boats could be solar powered or generate electricity while at anchor. The variations could be used without departing from the scope and spirit of the novel features of the present invention.

Accordingly, the scope of the invention should be determined not by the illustrated embodiments, but by the appended claims and their legal equivalents.

What is claimed is:

1. A clean energy powered surfboard for use by a surfer in surfing ocean waves, comprising:
a) a board surface configured in a conventional length, width, and shape,
b) a clean energy storage, enclosed within the board surface,
c) a clean energy motor, enclosed within the board surface,
d) at least one intake tube connected to the motor, enclosed within the board surface,
e) an intake port position on the board surface for taking in water from the ocean, connected to each intake tube,
f) at least one output tube connected to the motor, enclosed within the board surface,
g) an output jet, for driving exhaust water back into the ocean, connected to each output tube,
h) an energy connection between the energy storage and the motor,
i) a switch for activating the transfer of stored energy to the motor,
wherein the motor is an electric motor,
wherein, when a surfer operates the switch a burst of thrust is created by the output jet for a period of time, wherein the period of time in a first mode is less than 10 seconds,
wherein the energy storage comprise one or more capacitors,
wherein the one or more capacitors are formed of substantially flat plates,
wherein at least one of substantially flat plates forms the structure of the board surface.

2. The clean energy powered surfboard of claim 1 wherein the energy storage charged before the board enters the ocean.

3. The clean energy powered surfboard of claim 1 further comprising a solar cell panel forming a portion of the board surface,
wherein the energy storage charged while the surfboard is in the ocean.

4. The clean energy powered surfboard of claim 1 further comprising at least one waterwheel comprising a plurality of vanes,
wherein the waterwheel is positioned on one of the bottom of the board surface or an edge near the rear of the surfboard,
wherein the waterwheel drives a generator to generate electricity when water flows past the waterwheel and impulses the exposed vanes,
wherein the waterwheel generator is connected to the energy storage, and
wherein, while riding a wave, a large amount of electrical energy is generated and stored.

5. The clean energy powered surfboard of claim 1 wherein, in a second mode when the surfer operates the switch, the motor provides a low, steady thrust for a second period of time greater than 10 seconds,
where the maximum speed, without wave assistance, is slower than the average speed of the surfer paddling a non-powered surfboard.

6. A clean energy powered surfboard for use by a surfer in surfing ocean waves, comprising:
a) a board surface configured in a conventional length, width, and shape,
b) a clean energy storage, enclosed within the board surface,
c) a clean energy motor, enclosed within the board surface,
d) at least one intake tube connected to the motor enclosed within the board surface,
e) an intake port position on the board surface for taking in water from the ocean, connected to each intake tube,
f) at least one output tube connected to the motor, enclosed within the board surface,
g) an output jet, for driving exhaust water back into the ocean, connected to each output tube,
h) an energy connection between the energy storage and the motor,
i) a switch for activating the transfer of stored energy to the motor, and
j) at least one channel having a channel input on the bottom of the board surface, an channel output on the top of the board surface, and a turbine generator configured between the channel input and the channel output,
wherein the motor is an electric motor,
wherein, when a surfer operates the switch, a burst of thrust is created by the output let for a period of time, wherein the period of time in a first mode is less than 10 seconds,
wherein the turbine generator is connected to the energy storage.

7. The clean energy powered surfboard of claim 6 wherein the at least one channel is positioned on the rear of the surfboard, such that while riding a wave, a large amount of electrical energy is generated and stored.

8. The clean energy powered surfboard of claim 6 wherein the turbine generator generates electricity when water flows through the channel in either direction, such that while sitting in the water, a relatively small amount of electrical energy is generated as each wave approaches and passes.

9. The clean energy powered surfboard of claim 6 wherein the energy storage charged before the board enters the ocean.

10. The clean energy powered surfboard of claim 6 wherein the one or more capacitors comprise canister capacitors.

11. The clean energy powered surfboard of claim 6 further comprising a solar cell panel forming a portion of the board surface,
wherein the energy storage charged while the surfboard is in the ocean.

12. The clean energy powered surfboard of claim 8 further comprising a solar cell panel forming a portion of the board surface,
wherein the energy storage charged while the surfboard is in the ocean.

13. The clean energy powered surfboard of claim 6 wherein the energy storage comprises one or more rechargeable batteries.

14. The clean energy powered surfboard of claim 6 wherein, in a second mode when the surfer operates the switch, the motor provides a low, steady thrust for a second period of time greater than 10 seconds,
where the maximum speed, without wave assistance, is slower than the average speed of the surfer paddling a non-powered surfboard.

15. A clean energy powered surfboard for use by a surfer in surfing ocean waves, comprising:
a) a board surface configured in a conventional length, width, and shape,
b) a clean energy storage, enclosed within the board surface,
c) a clean energy motor, enclosed within the board surface,
d) at least one intake tube connected to the motor, enclosed within the board surface,
e) an intake port position on the board surface for taking in water from the ocean, connected to each intake tube,
f) at least one output tube connected to the motor, enclosed within the board surface,
g) an output jet, for driving exhaust water back into the ocean, connected to each output tube,
h) an energy connection between the energy storage and the motor,
i) a switch for activating the transfer of stored energy to the motor,
wherein the motor is an electric motor,
wherein, when a surfer operates the switch, a burst of thrust is created by the output jet for a period of time, wherein the period of time in a first mode is less than 10 seconds,
wherein the electric motor further functions as a generator, forming an electric motor generator,
wherein at least one intake port functions as a channel input, positioned near the rear of the surfboard,
wherein at least one output jet functions as a channel output,
wherein the electric motor generator functions as a turbine generator,
wherein, while riding a wave, a large amount of electrical energy is generated by the electric motor generator and stored.

16. The clean energy powered surfboard of claim 15 wherein the energy storage charged before the board enters the ocean.

17. The clean energy powered surfboard of claim 15 wherein the one or more capacitors comprise canister capacitors.

18. The clean energy powered surfboard of claim 15 further comprising a solar cell panel forming a portion of the board surface,
wherein the energy storage charged while the surfboard is in the ocean.

19. The clean energy powered surfboard of claim 15 wherein the energy storage comprises one or more rechargeable batteries.

20. The clean energy powered surfboard of claim 15 wherein, in a second mode when the surfer operates the switch, the motor provides a low, steady thrust for a second period of time greater than 10 seconds,
where the maximum speed, without wave assistance, is slower than the average speed of the surfer paddling a non-powered surfboard.

21. A clean energy powered surfboard for use by a surfer in surfing ocean waves, comprising:
a) a board surface configured in a conventional length, width, and shape,
b) a clean energy storage, enclosed within the board surface,
c) a clean energy motor, enclosed within the board surface,
d) at least one intake tube connected to the motor, enclosed within the board surface,
e) an intake port position on the board surface for taking in water from the ocean, connected to each intake tube,
f) at least one output tube connected to the motor, enclosed within the board surface,
g) an output jet, for driving exhaust water back into the ocean, connected to each output tube,
h) an energy connection between the energy storage and the motor,
i) a switch for activating the transfer of stored energy to the motor,
wherein the motor is an electric motor,
wherein, when a surfer operates the switch, a burst of thrust is created by the output jet for a period of time, wherein the period of time in a first mode is less than 10 seconds,
wherein at least one fin comprises a fin output jet, wherein at least one output jet is positioned on a trailing edge of the at least one fin, wherein the fin output jet is lower in the water than the plane of the bottom of the board surface,
whereby effective thrust is greater than a configuration where the output jet is above the plane of the bottom of the board surface.

22. The clean energy powered surfboard of claim 21 further comprising at least one waterwheel comprising a plurality of vanes,
wherein the waterwheel is positioned on one of the bottom of the board surface or an edge near the rear of the surfboard,
wherein the waterwheel drives a generator to generate electricity when water flows past the waterwheel and impulses the exposed vanes,
wherein the waterwheel generator is connected to the energy storage, and
wherein, while riding a wave, a large amount of electrical energy is generated and stored.

23. The clean energy powered surfboard of claim 21 wherein, in a second mode when the surfer operates the switch, the motor provides a low, steady thrust for a second period of time greater than 10 seconds,
- where the maximum speed, without wave assistance, is slower than the average speed of the surfer paddling a non-powered surfboard.

24. The clean energy powered surfboard of claim 21 wherein the energy storage stores hydrogen, wherein the electric motor is powered by a hydrogen fuel cell.

25. The clean energy powered surfboard of claim 21 further comprising a solar cell panel forming a portion of the board surface,
- wherein the energy storage charged while the surfboard is in the ocean.

26. The clean energy powered surfboard of claim 21 wherein the energy storage comprises one or more rechargeable batteries.

* * * * *